United States Patent [19]

Glasgow

[11] 4,226,579
[45] Oct. 7, 1980

[54] CRUST FORMING DEVICE

[76] Inventor: Luther E. Glasgow, 2122 Lakeshore Ave., Oakland, Calif. 94606

[21] Appl. No.: 933,456

[22] Filed: Aug. 14, 1978

[51] Int. Cl.$^2$ ............................................. A47J 43/00
[52] U.S. Cl. ................................. 425/218; 425/263
[58] Field of Search .............................. 425/218, 263

[56] References Cited
U.S. PATENT DOCUMENTS

| | | | |
|---|---|---|---|
| 3,451,359 | 6/1969 | Glasgow | 425/263 |
| 3,902,837 | 9/1975 | Glasgow | 425/218 |
| 4,040,734 | 8/1977 | Glasgow | 425/218 |

Primary Examiner—Lester L. Lee
Attorney, Agent, or Firm—Flehr, Hohbach, Test, Albritton & Herbert

[57] ABSTRACT

Device for constructing a crust along the side and/or bottom walls of a container from a mass of crust material placed in the container. The device includes a forming head having a bottom wall and an upstanding side wall, with means for supporting the forming head for rotation generally about the center of the container with the bottom and side walls of the forming head in facing relationship with the corresponding walls of the container. Some embodiments include means for introducing material and/or filling material into the container.

21 Claims, 14 Drawing Figures

FIG_1

FIG_2

FIG_3

FIG_4

FIG_5

FIG_6

FIG_7

FIG_8

FIG_9

FIG_10

FIG_11

FIG_12

FIG_13

FIG_14

CRUST FORMING DEVICE

BACKGROUND OF THE INVENTION

This invention pertains generally to apparatus for making crusts and more particularly to a device for forming a crust in a container from a mass of crust material placed in the container and thereafter introducing a filling into the container.

Food products having crusts along the bottom and/or side walls thereof are produced both commercially in large quantities for retail use and sale and domestically in smaller quantities for individual or more limited use. Such products may be baked, fried, frozen or otherwise processed and may comprise a variety of materials. One frequently preferred type of crust for such products is a so-called "crumb crust" which comprises a mixture of crumbs (e.g., graham cracker crumbs or crushed grain flakes) and a binder (e.g., shortening) that enables the mixture to be worked and to maintain a shape imposed thereon.

Examples of devices heretofore provided for use in the formation of such crusts are found in my previously issued U.S. Pat. Nos. 3,451,359, 3,902,837, and 4,040,734. The present invention provides a device which is particularly suitable for high speed and multiple head commercial applications, but which can also be used individually or domestically.

SUMMARY AND OBJECTS OF THE INVENTION

The crust forming device of the invention includes a forming head having the bottom wall with a generally flat portion which is generally parallel to the bottom wall of the container and an inclined portion which extends upwardly from the flat portion and upwardly and outwardly from the axis of the container. The side wall of the forming head has a portion immediately adjacent to the flat portion of the bottom wall which conforms generally to the peripheral curvature of the side wall of the container.

It is in general an object of the invention to provide a new and improved device for forming a crust along the bottom and/or side walls of a container.

Another object of the invention is to provide a forming device of the above character which is particularly suitable for high speed commercial applications, but which can also be used on an individual or domestic basis.

Another object of the invention is to provide a forming device of the above character which includes means for introducing crust material and/or filling material into the container.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
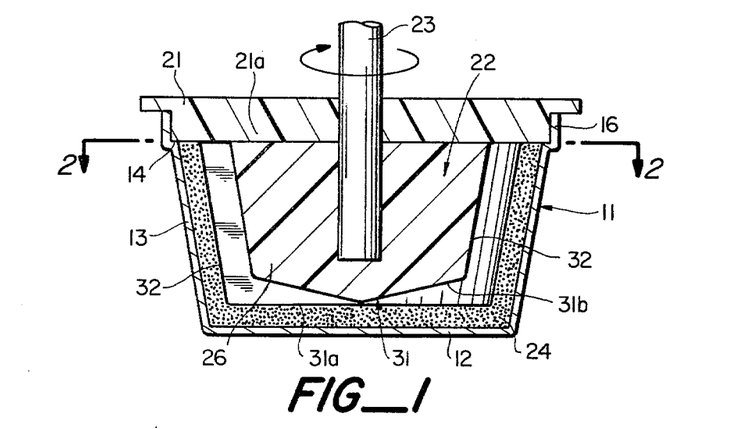
FIG. 1 is a centerline sectional view of one embodiment of a crust forming device according to the invention in operative association with a container.
Figure 2:
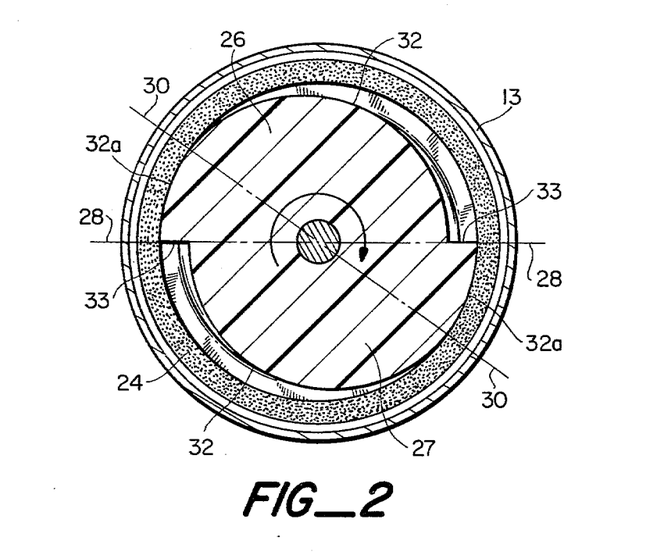
FIG. 2 is a horizontal sectional view taken along line 2—2 in FIG. 1.

In FIGS. 1 and 2, the crust forming device is illustrated in conjunction with a container 11 which has a generally planar circular bottom wall 12 and a frustoconical parametric side wall 13 extending upwardly and outwardly from the bottom wall. The upper portion of the side wall includes an outwardly projecting annular rim 14 and a vertically extending cylindrical flange 16. The particular container is shown by way of example only, and the invention is equally applicable to a wide variety of other containers. In this regard, side wall 13 can be inclined at a greater angle, or it can be vertical, and rim 14 can be narrower or wider, or it can be omitted entirely. Likewise, flange 16 can be a raw or hemmed flange, a raised or full bead, or it can be omitted entirely. The crust former can be constructed in a manner compatible with any container, rim style or closure design for the container.

The forming head includes a generally circular plate 21, a depending forming head 22 and a drive shaft 23. Plate 21 includes a depending hub portion 21a which is received within flage 16 and constrains the forming head for rotation generally about the center of the container. When the forming head is inserted in the container to the proper depth, the lower surface of hub portion 21a abuts against the upper surface of rim 14. The plate also serves as a forming element for the upper edge of the side wall of crust 24 and prevents the accumulation of crust material on rim 14.

Forming head 22 is affixed to plate 21 and includes two lobes 26, 27 which are disposed on opposite sides of a diametric line 28. Each of the lobes includes a bottom wall 31 and a curved side wall 32 having an arc length on the order of 180°. As best seen in FIG. 2, the two lobes are laterally offset along line 28, with lobe 26 extending beyond lobe 27 on the left and lobe 27 extending beyond lobe 26 on the right, as viewed in this figure. The bottom wall of each lobe has a generally flat portion 31a on one side thereof and an upwardly inclined portion 31b on the other side. The flat portions of the two bottom walls are diametrically opposed, with the inclined portions interposed between them. Thus, the flat portion of the bottom wall of lobe 26 is generally adjacent to the inclined portion of the bottom wall of lobe 27, and the inclined portion of lobe 26 is generally adjacent to the flat portion of lobe 27. In the embodiment illustrated, the flat portions of the bottom walls are generally sector-shaped and extend through an angle on the order of 35° between diametric lines 28, 30 in FIG. 2. The extent of the flat portions is not critical and may be between 0° and 180°. The inclined portions of the bottom walls of the lobes follow a generally helical path and are inclined upwardly and outwardly from the central axis of the forming head and upwardly from the flat portions of the lobes. If desired, the inclined portions can have a concave or convex curvature.

A generally radial side wall 33 extends along line 28 between the offset portions of the side walls of the two lobes on each side of the forming head, as well as between the diverging bottom walls of the lobes.

Side walls 32, 32 are inclined upwardly and outwardly in the same general fashion as side wall 13 of the container. In the embodiment illustrated, side walls 32, 32 are disposed eccentrically of shaft 23. Each of the side walls includes a portion 32a which conforms generally to the peripheral curvature of the side wall of the container. The conforming portions of the side walls are immediately adjacent to and preferably coextensive with the flat portions 31a of the bottom walls of the lobes. These adjoining portions serve to diffuse the crust material and are positioned on the sides of the lobes which trail as the lobes are rotated. Although portions 32a are illustrated as curvilinear surfaces, they can have other suitable contours such as a plurality of generally planar sections having an overall contour which generally approximates the curvature of the container. One particular preferred contour for wall portions 32a is an arc of lesser radius than the container side wall, centered at the axis of the container.

While the forming head is illustrated as a solid body, it can be formed as a hollow structure, which is the preferred structure when the device is formed by a molding process. Similarly, plate 21 can be an annular plate which extends outwardly from side walls 32 but does not cover the central portion of the forming head.

Figure 3:
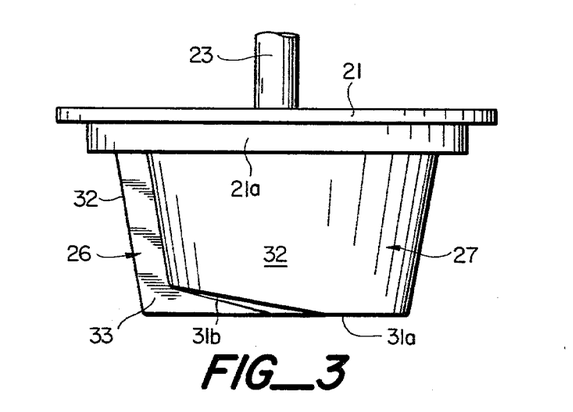
FIG. 3 is a side elevational view of the crust forming device of FIGS. 1-2.

Operation and use of the device of FIGS. 1-3 is as follows. A measured quantity of crust material is poured or otherwise introduced into the container. The forming head is aligned axially with the container, inserted into the container and rotated by means of shaft 23. Because of the inclined portions of the bottom walls and the offsets at the sides of the forming head, the forming head tends to auger into and diffuse the crust material as it is simultaneously pressed into the container and rotated, with flat portions 31a and side walls 32 serving to distribute and form the material along the bottom and side walls of the container. Plate 21 cooperates with flange 16 to position the forming head for rotation generally about the center of the container. In addition, the plate cooperates with rim 14 to limit the travel of the forming head into the container and serves to prevent the accumulation of crust material on rim 14.

Since the distribution of the crust material is effected by relative axial movement rotation of the forming head and container, it will be understood that the device can also be used with the forming head in a fixed position and the container being moved toward and rotated about the forming head. With the forming device shown in FIGS. 1-3, the container would be raised and rotated in the counter-clockwise direction, as viewed in FIG. 2, to provide the proper distribution of crust material.

In commercial applications for making crusts in large quantities, the forming device of FIGS. 1-3 can be used with a machine having a table or holder for receiving the container and a power head for receiving shaft 23. For purposes of illustration, it is assumed that the table is stationary and the power head is retractable, although these functions can be reversed. Such a machine might also have a plurality of forming devices for making a plurality of crusts simultaneously. In such a machine, the containers are moved onto the table or holders, and the crust material is introduced if it has not been introduced previously. The forming heads are then lowered into the containers and rotated to effect distribution of the crust material in the manner described above. The forming heads are then withdrawn, and the containers are moved to another station where the newly formed crusts are filled or otherwise processed.

Figure 4:
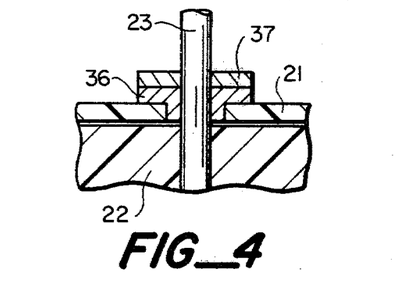
FIGS. 4 and 5 are fragmentary sectional views of other embodiments of crust forming devices according to the invention.

The embodiment of FIG. 4 is generally similar to the embodiment of FIGS. 1-3 except forming head 22 is rotatable relative to plate 21 instead of being affixed thereto. In this embodiment, drive shaft 23 is journalled for rotation in a bearing 36 mounted in plate 21. The shaft is retained in the bearing by a collar 37 which is affixed to the shaft by suitable means such as a set screw, not shown.

Operation and use of the embodiment of FIG. 4 is generally similar to that heretofore described. However, in this embodiment, plate 21 remains stationary and does not rotate with the forming head.

Figure 5:
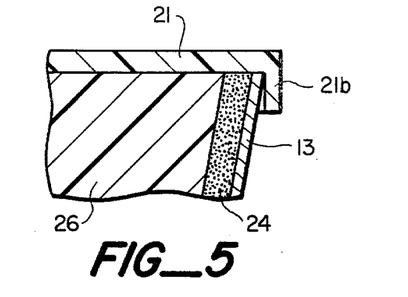

FIG. 5 illustrates a forming device which can be used with a container having a side wall with no upstanding flange at the rim of the container. Its use is not limited to such containers, however. This device is similar to the other embodiments disclosed herein, but plate 21 has a depending flange or skirt 21b which is positioned outside the side wall of the container. Flange 21b can be either a continuous flange which surrounds the container or a plurality of arcuate sections spaced circumferentially about the periphery of plate 21. This flange serves as a guide in positioning the forming head for rotation generally about the center of the container. As in the other embodiments, the container can be rotated about the forming head, if desired.

Figure 6:
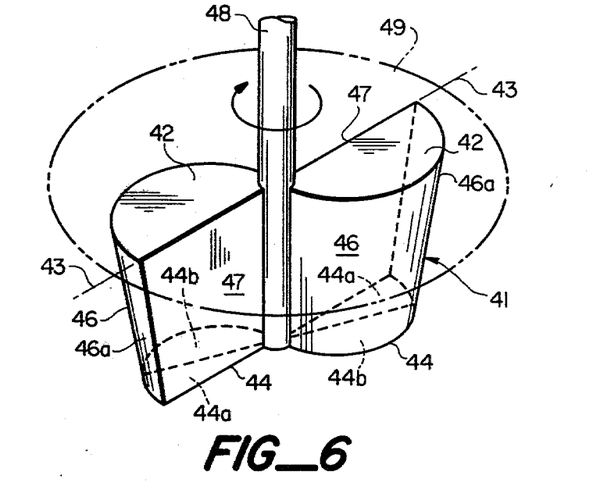
FIGS. 6 and 7 are isometric views of additional embodiments of crust forming devices according to the invention, with the guide plates shown in phantom lines for clarity of illustration.

In the embodiment of FIG. 6 the forming device includes a forming head 41 having lobes 42, 42 offset toward opposite ends of a diametric line 43. Each of the lobes has a bottom wall 44, a peripherally curved side wall 46, and a radial face 47 aligned generally with diametric line 43. The bottom walls include flat portions 44a and inclined portions 44b, and the side walls each have an arc length on the order of 180°. As in the embodiment of FIGS. 1-3, the inclined portions of bottom walls 44 extend along generally helical paths, in that they are inclined upwardly from flat portions 44a and upwardly and outwardly from the central axis of the forming head. Each lobe has a length along diametric line 43 on the order of one-half of the diameter of the container, and the contour of the side walls is such that they approach closer to the side wall of the container toward the ends of diametric line 43, with portions 46a conforming generally to the peripheral contour of the side wall of the container. As in the previous embodiment, conforming wall portions 46a are immediately adjacent to and preferably coextensive in arc length with flat portions 44a. If it is desired to form a crust along only a portion of the container walls, the forming head can be dimensioned so that the flat portions of the bottom walls and/or the conforming portions of the side walls will wipe against the portions of the container walls where no crust is to be formed.

Means is provided for rotating the forming head generally about the center of a container, with the bottom and side walls of the lobes facing the corresponding walls of the container. This means includes a shaft 48 which is affixed to the lobes and a guide plate 49 which is engageable with the upper portion of the container. The shaft can either be journalled for rotation in the guide plate, in which case the guide plate will remain in stationary engagement with the container when the forming head is rotated, or the shaft can be affixed to the plate, in which case the forming head and plate will rotate as a unit.

Operation and use of the forming device of FIG. 6 is similar to that heretofore described. The device is placed in the container and rotated in the clockwise direction, as viewed from above, to effect spreading of the crust material along the side and/or bottom walls of the container.

Figure 7:
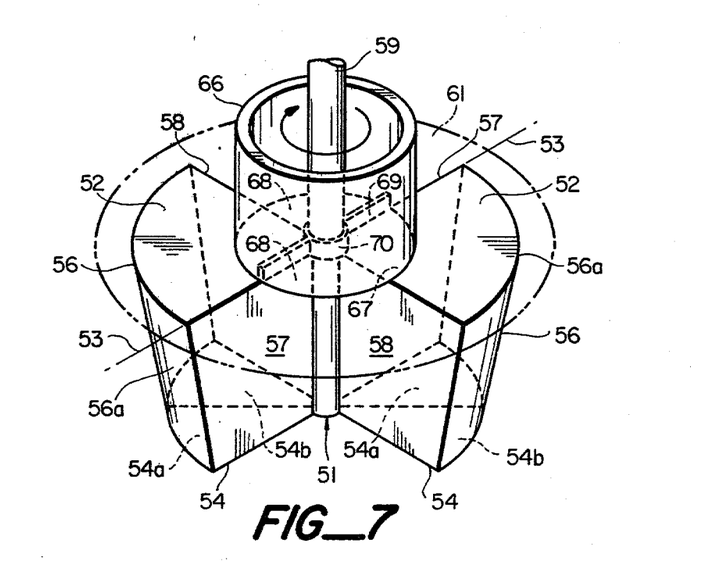

FIGS. 7–14 illustrate crust forming devices which include means for introducing crust material and/or filling material into a container while the forming head is operatively positioned therein. In the embodiment of FIG. 7, the forming device includes a forming head 51 having lobes 52, 52 offset toward opposite ends of a diametric line 53. Each of the lobes has a bottom wall 54, a parametric side wall 56, and a pair of radial faces 57, 58 with faces 57 extending generally in the direction of diametric line 53 and faces 58 being generally at right angles to faces 57. Bottom walls 54 include generally flat portions 54a adjacent to radial faces 57 and inclined portions 54b adjacent to radial faces 58. As in the previous embodiments, inclined bottom wall portions 54b extend along generally helical paths, i.e., upwardly from flat portions 54a and upwardly and outwardly from the central axis of the device. Peripheral walls 56 have an arc length on the order of 90°, and they include portions 56a adjacent to radial faces 57 which conform generally with the parametric curvature of the container side wall. Wall portions 56a are immediately adjacent to and preferably coextensive with the flat portions 54a of the bottom walls.

The embodiment of FIG. 7 also includes a shaft 59 which is affixed to the lobes of the forming head and a generally circular guide plate 61 which is engageable with the upper portion of a container for constraining the forming head for rotation generally about the center of the container with the bottom and side walls of the forming head facing the corresponding walls of the container.

Means is provided for introducing crust material and/or filling material into the container. This means includes an upstanding cylindrical tube 66 which is positioned coaxially of shaft 59 and affixed to plate 61. This plate is formed with a circular opening 67 which is aligned with the opening in the tube to form passageways 68 through which the crust material or filling material can pass into the container in the region between the confronting radial faces 57, 58 of the lobes.

A strut 69 extends diametrically of the hollow tube adjacent to the upper surface of the forming head, and shaft 59 is rotatively journalled in a bearing 70 carried by the strut. The strut serves the dual function of supporting the shaft and wiping crust material from the upper surfaces of the forming head. Alternatively, the tube and plate can be affixed to the forming head and shaft for rotation as a unit, in which case the strut can be omitted.

Operation and use of the embodiment of FIG. 7 is generally similar to that of the devices heretofore described. However, with the embodiment of FIG. 7, it is not necessary to introduce the crust material into the container before the forming device is inserted therein. With the forming device positioned in the container, and either rotating or stationary, crust material can be introduced through tube 66 and passageways 68. Once the crust has been formed, rotation of the forming head is stopped, and a filling material can be introduced through the tube and passageways. The introduction of the filling material can continue as the device is removed from the container to completely fill the region within the crust, if desired.

A tube similar to tube 66 can be utilized equally well with other types of forming heads, including the embodiment of FIG. 6.

Figure 8:
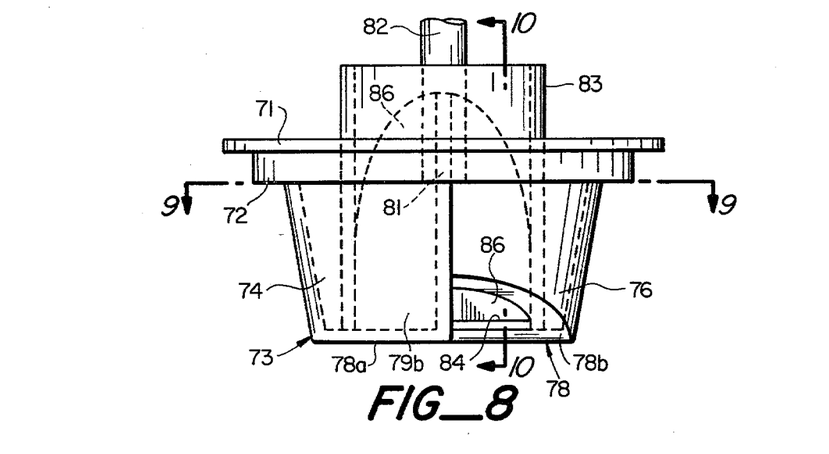
FIG. 8 is a side elevational view of another embodiment of a crust forming device according to the invention.
Figure 9:
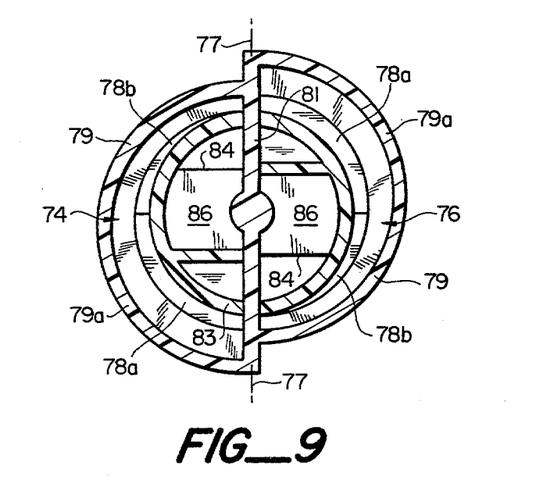
FIG. 9 is a horizontal sectional view taken along line 9—9 in FIG. 8.
Figure 10:
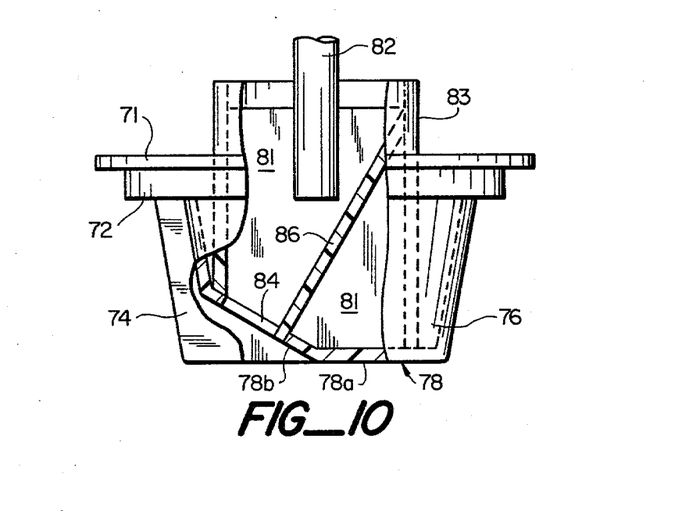
FIG. 10 is a cross sectional view, partly broken away, taken along line 10—10 in FIG. 8.

The forming device of FIGS. 8–10 includes a generally circular guide plate 71 which is adapted to overlie the container and overhang the sides thereof, with a depending hub portion 72. This hub portion is adapted to be received within the upstanding flange at the upper extremity of the container side wall in the manner of guide plate 21 of the embodiment of FIGS. 1–3.

The device of FIGS. 8–10 also includes a forming head 73 having an external contour generally similar to the forming head of the embodiment of FIGS. 1–3. Forming head 73 includes a pair of lobes 74, 76 which are offset laterally along a diametric line 77. Each of the lobes includes a bottom wall 78 having a generally flat portion 78a and an inclined portion 78b. Each lobe also includes a parametric side wall 79 having a portion 79a which conforms generally to the parametric curvature of the container side wall. As in the other embodiments, these conforming wall portions are immediately adjacent to and preferably coextensive in arc length with the generally flat portions of the bottom walls. In the embodiment of FIGS. 8–9, the flat portions of the bottom walls and the conforming portions of the side walls each have an arc length on the order of 90°. The inclined portions of the bottom walls likewise have an arc length on the order of 90°, and an upstanding diametric wall 81 extends between the lateral extremities of side walls 79.

An axially extending drive shaft 82 is affixed to forming head 73, and a cylindrical tube 83 is provided for introducing crust material and/or filling material into the container through the forming head. This tube is positioned coaxially of the shaft and extends through an opening in plate 71 to the bottom walls of the forming head. The inclined portions of the bottom walls have openings 84 which communicate with the interior of the tube and define passageways through which the material can pass. Inclined baffle plates 86 are provided in the tube and serve to direct the crust and/or filling material to the passageways in the forming head. These baffle plates also serve to prevent material from accumulating in the forming head as it is introduced, and they further prevent the material from reentering the forming head from the container as the head is rotated.

Operation and use of the embodiment of FIGS. 8–10 is generally similar to that of the embodiment of FIG. 7. With the forming head inserted in the container and rotating, crust material can be introduced through tube 83 and passageways 84 for distribution along the side and/or bottom walls of the container. Once the crust has been formed, filling material can be introduced through the tube and passageways.

Figure 11:
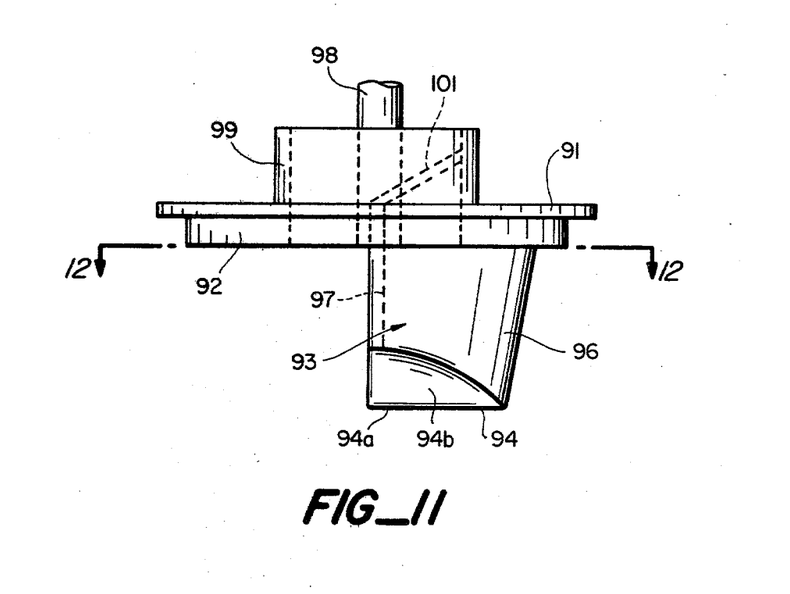
FIG. 11 is a side elevational view of a further embodiment of a crust forming device according to the invention.
Figure 12:
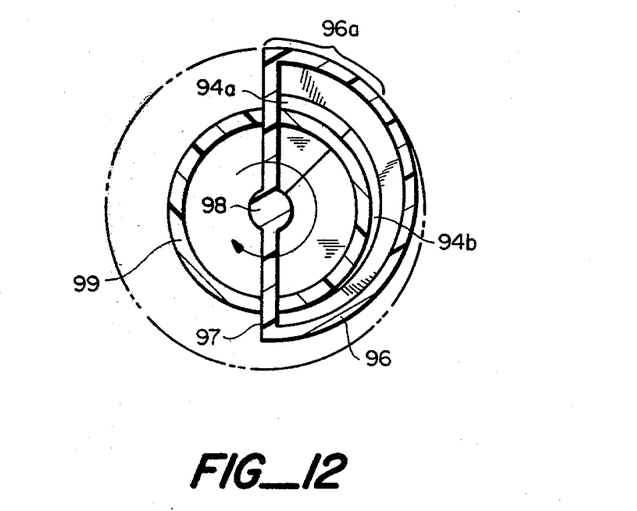
FIG. 12 is a horizontal sectional view taken along line 12—12 in FIG. 11.

The forming device of FIGS. 11-12 includes a generally circular guide plate 91 which is adapted to overlie the container, with a depending boss or flange 92 which is adapted to be received within the upstanding flange at the upper extremity of the side wall of a container in the manner of guide plate 21 of the embodiment of FIGS. 1-3.

The device of FIGS. 11-12 also includes a forming head 93 comprising a single lobe which is disposed eccentrically of guide plate 91 and the vertical axis of the container. The forming head includes a bottom wall 94 having a generally flat portion 94a and an inclined portion 94b. In this embodiment, the flat portion has an arcuate extent on the order of 40°, and the inclined portion extends through approximately 140°. As in the other embodiments, the inclined portion is inclined upwardly from the flat portion and upwardly and outwardly from the axis of the forming head. The forming head also includes a parametric side wall 96 having a portion 96a which conforms generally to the parametric curvature of the container side wall. Wall portion 96a is immediately adjacent to and preferably coextensive in arc length with the flat portion 94a of the bottom wall of the forming head. The forming head further includes a diametrically extending side wall 97 adjoining the parametric side wall and the bottom wall. An axially extending drive shaft 98 is affixed to the forming head as in the other embodiments.

An upstanding tube 99 for introducing crust material and/or filling material into the container is disposed coaxially of shaft 98 and affixed to guide plate 91. In the embodiment illustrated, the lower end of the tube is received in an opening in plate 91. The tube and plate are affixed to the forming head for rotation therewith, and a suitable baffle plate 101 prevents the crust and/or filling material from entering the forming head itself. Alternatively, the forming head and shaft can be mounted for rotation relative to the tube and plate. In this case, the top of the forming head would be closed, and a wiper similar to strut 69 of FIG. 7 could be employed to support the shaft within the tube and to wipe material from the upper surface of the forming head.

Operation and use of the embodiment of FIGS. 11-12 is similar to that heretofore described, particularly with regard to FIG. 7.

Figure 13:
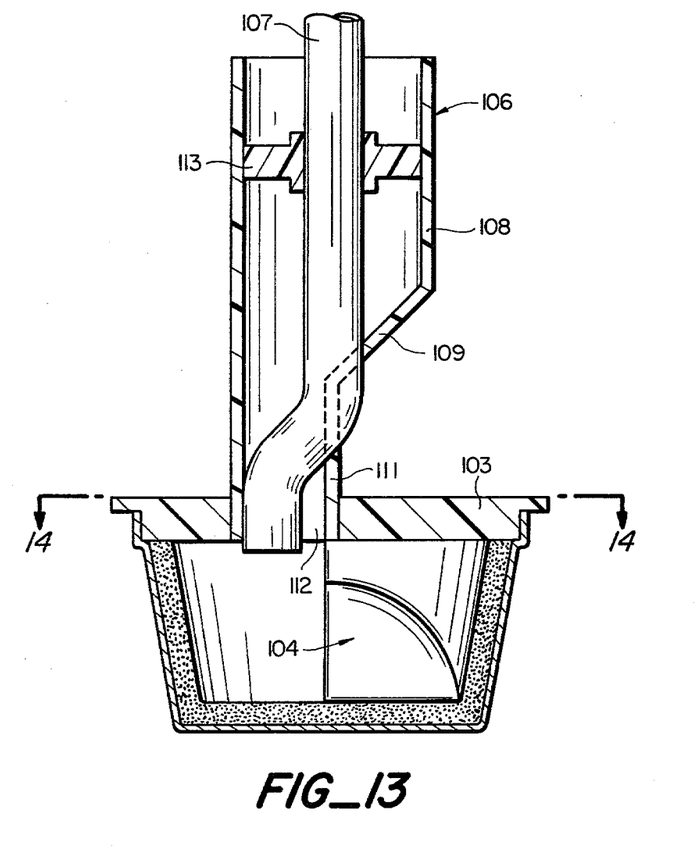
FIG. 13 is a centerline sectional view of another embodiment of a crust forming device according to the invention in operative association with a container.
Figure 14:
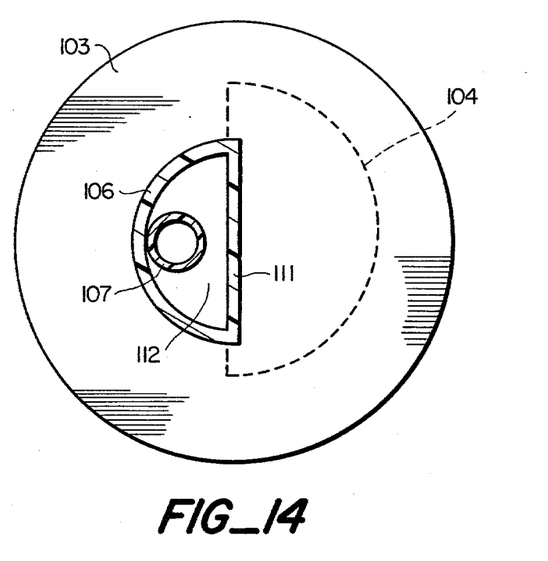
FIG. 14 is a horizontal sectional view taken along line 14—14 in FIG. 13.

The embodiment of FIGS. 13-14 includes a guide plate 103 and a forming head 104 which are generally similar to guide plate 91 and forming head 93 of FIGS. 11-12. This embodiment, however, has tubes 106, 107 defining separate passageways for the introduction of crust and filling material. Tube 106 has a generally cylindrical upper portion 108 which is centered about the axis of rotation of the device, an inclined side wall 109 which serves to direct crust material toward the open side of the forming head, and a diametrically extending vertical wall 111 which extends between the lower portion of wall 109 and plate 103. The lower portion of tube 106 is received in a generally semicircular opening 112 in plate 103.

The upper portion of tube 107 extends axially within tube 106 and serves as a drive shaft for the device. The lower portion is offset radially and passes through opening 112. A diametrically extending strut 113 holds the upper portions of tubes 106, 107 in the proper positional relationship, and the lower portion of tube 107 is secured to wall 111 by suitable means such as cementing or a bracket, not shown.

Operation and use of the forming device of FIGS. 13-14 is as follows. The device is inserted into the container until plate 103 abuts against the upper portion of the container rim. Crust material is introduced into the passageway formed between the inner wall of tube 106 and the outer wall of tube 107 and drops through opening 112 into the container. The crust material can be introduced before, during or after insertion of the forming device into the container. Either during or after the introduction of crust material, the forming device is rotated to distribute the material along the side and/or bottom walls of the container. Once the crust has been formed, rotation of the forming device is stopped, and filling material is introduced into the container through tube 107 by gravity or under pressure. The introduction of filling material can continue as the device is removed from the container to completely fill the region within the crust, if desired.

Rather than utilizing tube 107 both as a drive shaft and as a tube for the introduction of filling material, a separate drive shaft and tube can be provided, if desired. In this case, the shaft would extend axially and be affixed to the forming head in the manner of shaft 98 in FIGS. 11-12. The filling tube would be displaced from the axis of the device and would extend straight through the outer tube and the semicircular opening in plate 103 in a direction generally parallel to the shaft.

It is apparent from the foregoing that a new and improved crust forming device has been provided. While only certain presently preferred embodiments have been described in detail, as will be apparent to those familiar with the art, certain changes and modificaitons can be made without departing from the scope of the invention as defined by the following claims.

What is claimed is:

1. In a crust forming device for use with a container having a bottom wall and a peripheral side wall: a forming head having a bottom wall and an upstanding side wall, the bottom wall of the forming head including a first portion which throughout its radial extent is generally parallel to the bottom wall of the container and a second portion which is inclined upwardly from the first portion and upwardly and outwardly toward the side wall of the forming head, the side wall of the forming head having a portion immediately adjacent to the first portion of the bottom wall which conforms generally to the peripheral contour of the side wall of the container, and means connected to the forming head for positioning the same in the container for relative rotation of the forming head and the container with the bottom and side walls of the forming head in facing relationship with the corresponding walls of the container.

2. The device of claim 1 including means defining a passageway for introducing material through the device into the container.

3. The device of claim 1 wherein the means connected to the forming head comprises a member engageable with the upper portion of the container and a shaft rotatively mounted in the member and affixed to the forming head.

4. In a crust forming device for use with a container having a bottom wall and a peripheral side wall: a forming head having two lobes each comprising a bottom wall and a peripherally curved upstanding side wall, the two lobes being disposed on opposite sides of a line and being offset along the line whereby the lobes extend laterally beyond each other toward opposite ends of the line, and means connected to the forming head for positioning the same in the container for relative rotation of the forming head and the container with the bottom and side walls of the forming head facing the corresponding walls of the container.

5. The crust forming device of claim 4 wherein one of the bottom walls of the lobes includes a portion inclined upwardly toward one end of the line.

6. The crust forming device of claim 4 wherein the means connected to the forming head includes a member engageable with the upper portion of the container and a shaft affixed to the forming head.

7. The crust forming device of claim 6 wherein the shaft is journalled for rotation relative to the member.

8. In a crust forming device for use with a container having a bottom wall and a peripheral side wall: a plate member engageable with the upper portion of the side wall of the container, a forming head depending from the plate member and having a bottom wall and a side wall having portions corresponding in contour generally to portions of the bottom and side walls of the container, and a tube connected to the forming head and extending above the plate member for introducing material through the device into the container, said plate member and said tube cooperating to position the forming head in the container for relative rotation of the forming head and the container to effect spreading of crust material along at least a portion of at least one of the walls of the container.

9. The crust forming device of claim 8 wherein the side wall of the forming head has an arc length on the order of 180°, said side wall being positioned eccentrically of the shaft and serving as a spreader for the crust material upon relative rotation of the forming head and the container.

10. The crust forming device of claim 8 wherein the forming head has two lobes each comprising a bottom wall and a peripherally curved upstanding side wall having an arc length on the order of 180°, the two lobes being disposed on opposite sides of a line and being offset along the line whereby the lobes extend laterally beyond each other toward opposite ends of the line.

11. In a crust forming device for use with a container having a bottom wall and a peripheral side wall: a forming head having a bottom wall and a side wall, means connected to the forming head for positioning the same in the container for relative rotation of the forming head and the container with the bottom and side walls of the forming head facing the corresponding walls of the container, and means for introducing material into the container while the forming head is positioned therein.

12. The device of claim 11 wherein the forming head includes a passageway communicating with the interior of the container and the means for introducing material into the container includes a tube communicating with the passageway.

13. The device of claim 12 wherein the means for positioning the forming head includes a shaft disposed within the tube for introducing material into the container.

14. The crust forming device of claim 11 wherein the means for positioning the forming head includes a plate member engageable with the upper portion of the container.

15. The crust forming device of claim 11 wherein the means for introducing material comprises first and second tubes.

16. The forming device of claim 15 wherein the second tube is positioned within the first tube.

17. The crust forming device of claim 1 wherein the means for positioning the forming head includes a plate member overlying the upper portion of the container and a flange depending from the plate for engagement with the outer portion of the container.

18. The crust forming device of claim 4 wherein the means for positioning the forming head includes a plate member overlying the upper portion of the container and a flange depending from the plate for engagement with the outer portion of the container.

19. The crust forming device of claim 8 further including a flange depending from the plate member for peripheral engagement with the container to position the forming head within the container.

20. The crust forming device of claim 11 wherein the means for positioning the forming head within the container includes a flange for peripheral engagement with the container.

21. The crust forming device of claim 4 including means for introducing material through the device into the container.

* * * * *